United States Patent
Jin et al.

(10) Patent No.: US 7,760,096 B2
(45) Date of Patent: *Jul. 20, 2010

(54) RADIO FREQUENCY IDENTIFICATION (RFID) TAG ENCRYPTION METHOD AND SYSTEM USING BROADCAST ENCRYPTION (BE) SCHEME

(75) Inventors: Weon-il Jin, Suwon-si (KR); Maeng-hee Sung, Seoul (KR); Dae-youb Kim, Seoul (KR); Hwan-joon Kim, Seoul (KR); Mi-suk Huh, Suwon-si (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/498,390

(22) Filed: Jul. 7, 2009

(65) Prior Publication Data

US 2009/0278664 A1  Nov. 12, 2009

Related U.S. Application Data

(63) Continuation of application No. 11/511,360, filed on Aug. 29, 2006, now Pat. No. 7,576,651.

(30) Foreign Application Priority Data

Sep. 2, 2005  (KR) ............................... 2005-81741

(51) Int. Cl.
*G08B 13/14* (2006.01)
*H04M 1/66* (2006.01)

(52) U.S. Cl. ................................... 340/572.1; 455/411

(58) Field of Classification Search .............. 340/572.1; 455/411, 456.1; 705/50; 713/168
See application file for complete search history.

(56) References Cited

U.S. PATENT DOCUMENTS

| | | | | |
|---|---|---|---|---|
| 5,787,174 | A * | 7/1998 | Tuttle | 713/168 |
| 7,576,651 | B2 * | 8/2009 | Jin et al. | 340/572.1 |
| 2004/0222878 | A1 | 11/2004 | Jules | |
| 2005/0036620 | A1 | 2/2005 | Casden et al. | |
| 2005/0058292 | A1 | 3/2005 | Diorio et al. | |
| 2005/0070257 | A1 * | 3/2005 | Saarinen et al. | 455/411 |
| 2006/0085637 | A1 * | 4/2006 | Pinkas | 713/168 |
| 2008/0071637 | A1 * | 3/2008 | Saarinen et al. | 705/26 |

FOREIGN PATENT DOCUMENTS

KR  10-2004-0092669  11/2004

* cited by examiner

*Primary Examiner*—John A Tweel, Jr.
(74) *Attorney, Agent, or Firm*—NSIP Law (57) ABSTRACT

A radio frequency identification (RFID) tag encryption method and system using a broadcast encryption (BE) scheme are provided by encrypting an ID of an RFID tag, storing the encrypted ID in a server and the RFID tag, and storing information relating to a reader authorized to read out the RFID tag in the server so that the reader can read out the RFID tag by decrypting the encrypted ID based on the encrypted ID information read from the RFID tag and the reader information. When readers read out ID data from the RFID tag, a privileged reader can read the data. Thus, it is possible to block unintended information leakage to the readers. In addition, user usability can be enhanced since an attacker cannot perform an access lock on the RFID tag.

21 Claims, 5 Drawing Sheets

RADIO FREQUENCY IDENTIFICATION (RFID) TAG ENCRYPTION METHOD AND SYSTEM USING BROADCAST ENCRYPTION (BE) SCHEME

CROSS-REFERENCE TO RELATED APPLICATIONS

This application is a continuation application of U.S. patent application Ser. No. 11/511,360 filed on Aug. 29, 2006 U.S. Pat. No. 7,576,651 B2 to Jin et al, issued on Aug. 18, 2009, the entire disclosure of which is hereby incorporated by reference for all purposes. This application also claims the benefit under 35 U.S.C. §119(a) of Korean Patent Application No. 2005-81741 filed on Sep. 2, 2005 in the Korean Intellectual Property Office, the entire disclosure of which is hereby incorporated by reference for all purposes.

BACKGROUND OF THE INVENTION

1. Field of the Invention

The present invention generally relates to a method and system of encrypting a radio frequency identification (RFID) tag using a broadcast encryption (BE) scheme. More particularly, the present invention relates to an RFID tag encryption method and system using a BE scheme by encrypting an ID of an RFID tag, storing the encrypted ID in a server and the RFID tag, and storing information relating to a reader authorized to read out the RFID tag in the server so that the reader can read out the RFID tag by decrypting the encrypted ID based on the encrypted ID information read from the RFID tag and the reader information.

2. Description of the Related Art

Typically, the RFID technique is used to identify a person or objects an RFID tag is attached to within a short distance of about 1 meter without requiring physical contact. The RFID tag is attached to entities such as assets, animals and persons to allow a reader coupled to a host computer to automatically identify or track the entities. Mostly, the RFID tag contains programmed information of an object and the programmed information is attached to the object.

The RFID includes a receiver, transmitter in various types, antenna, and memory. The RFID tag is capable of transmitting, receiving and storing entity ID data with respect to a remote base station using its components.

However, when the reader reads out the ID data from the RFID tag, unintended information may be leaked out to other readers.

To record the ID data, the RFID tag needs to occupy a memory area more than a certain size. If an attacker conducts an access lock on the RFID tag, it is impossible to use the RFID tag.

If the RFID tag is applied to the merchandise flow system, when an attacker continuously sends random information to the reader from malice, the reader is likely to retry to identify the RFID tag according to a collision avoidance algorithm without reading out necessary information from the RFID tag.

Therefore, a need arises for the encryption of the RFID tag for the sake of privacy.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an RFID tag encryption method and system using a BE scheme by encrypting an ID of an RFID tag, storing the encrypted ID in a server and the RFID tag, and storing information relating to a reader authorized to read out the RFID tag in the server so that the reader can read out the RFID tag by decrypting the encrypted ID based on the encrypted ID information read from the RFID tag and the reader information.

To achieve the above aspect and/or feature of exemplary embodiments of the present invention, a radio frequency identification (RFID) tag encryption service server, using a broadcast encryption (BE) scheme, encrypts an ID of the RFID tag, generates and stores an index and a header according to information of readers authorized to read the RFID tag, stores the index, the header and the encrypted ID in an internal storing means, and stores the encrypted ID in an RFID tag to be distributed, and transmits the index and the header corresponding to the encrypted ID to a certain reader when the encrypted ID is received from the certain reader.

In an exemplary implementation, when receiving a request to add a revoked reader incapable of reading the RFID tag from the certain reader, the RFID tag encryption service server may generate and store an index and a header corresponding to revoked readers including the revoked reader to prevent the reading of the RFID tag.

In another exemplary implementation, when receiving a request to add a non-revoked reader capable of reading the RFID tag, the RFID tag encryption service server may generate and store an index and a header corresponding to privileged readers including the non-revoked reader to allow the reading of the RFID tag.

In accordance with another aspect of exemplary embodiments of the present invention, an RFID tag, using a BE scheme, stores an index and a header, which are generated according to information relating to privileged readers, and an encrypted ID.

In accordance with another aspect of exemplary embodiments of the present invention, an RFID reader identifies an RFID tag using a BE scheme by analyzing an index and a header when the RFID reader reads out an encrypted ID from the RFID tag which stores the index, the header according to information relating to privileged readers, and the encrypted ID, and decrypting the encrypted ID.

In accordance with another aspect of exemplary embodiments of the present invention, an RFID reader identifies an RFID tag using a BE scheme by transmitting an encrypted ID to an RFID encryption service server when the encrypted ID is read out from the RFID tag which stores the encrypted ID, and receiving from the RFID encryption service server and analyzing an index and a header corresponding to the encrypted ID, and decrypting the encrypted ID.

In accordance with another aspect of exemplary embodiments of the present invention, an RFID encryption service server, using a BE scheme, generates and stores a random seed set, stores one element of the random seed set in an RFID tag together with a seed ID and encrypts an ID of the RFID tag, and generates and stores an index and a header corresponding to the RFID tag in an internal storing means, and stores the encrypted ID in the RFID tag.

In accordance with another aspect of exemplary embodiments of the present invention, when the seed ID, which is a location of a random number, and a random number ID (RID) are received from a certain reader, the RFID encryption service server may generate the encrypted ID from the RID and transmit an index and a header corresponding to the generated encrypted ID to the certain reader.

In accordance with another aspect of exemplary embodiments of the present invention, an RFID reader, using a BE scheme, transmits a seed ID, which is a location of a random number, and an RID, which are read out from an RFID tag, to an RFID encryption service server, acquires an ID encryption key by analyzing an index and a header received from the RFID encryption service server and transmits the acquired ID encryption key to the RFID encryption service server, and identifying the RFID tag based on an ID of the RFID tag received from the RFID tag encryption service server.

In accordance with another aspect of exemplary embodiments of the present invention, an RFID tag generates a random number according to a reading operation performed by a certain reader and transmits a location of the random number based on a seed of the random number, a seed ID, and an RID to the certain reader.

In accordance with another aspect of exemplary embodiments of the present invention, an RFID tag encryption method using a BE scheme, comprises an index, a header, and an encrypted ID from an RFID tag which stores the index, the header according to information relating to privileged readers, and the encryption ID are read out; and the RFID tag is identified by analyzing the index and the header and the encrypted ID is decrypted.

In accordance with another aspect of exemplary embodiments of the present invention, an RFID tag encryption method using a BE scheme, comprises an encrypted ID received from a certain reader while an index and a header according to information relating to privileged reader, and the encrypted ID are generated and stored in an internal storing means; and the index and the header corresponding to the encrypted ID are transmitted to the certain reader.

In an exemplary implementation, when a request to add a non-revoked reader capable of reading the RFID tag is received from the certain reader, an index and a header corresponding to privileged readers including the non-revoked reader may be generated and stored to allow the reading of the RFID tag.

In an exemplary implementation, when a request to add a revoked reader incapable of reading the RFID tag is received from the certain reader, an index and a header corresponding to revoked readers including the revoked reader may be generated and stored to block the reading of the RFID tag.

In accordance with another aspect of exemplary embodiments of the present invention, an RFID encryption method using a BE scheme, comprises a random seed set in an internal storing means are generated and stored while generating and storing an index and a header, according to information relating to privileged readers, and an encrypted ID, and one element of the random seed set in an RFID tag is stored together with a seed ID; a location of a random number is received based on a seed of the random number, the seed ID, and an RID from a certain reader; the encrypted ID is generated from the RID and an index and a header corresponding to the encrypted ID is transmitted to the certain reader; an ID encryption key is received from the certain reader; and the encrypted ID using the ID encryption key is decrypted and an ID of the RFID tag is transmitted to the certain reader.

In accordance with another aspect of exemplary embodiments of the present invention, an RFID encryption method using a BE scheme comprises a random number is generated when a certain reader performs an ID identifying operation; and a location of the random number is transmitted based on a seed of the random number, a seed ID, and an RID to the certain reader.

In accordance with another aspect of exemplary embodiments of the present invention, an RFID encryption method using a BE scheme comprises an ID encryption key is acquired by analyzing an index and a header read from an RFID tag and the acquired ID encryption key is transmitted to an RFID tag encryption service server; and the RFID tag is identified based on an ID of the RFID tag received from the RFID tag encryption service server.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWING FIGURES

These above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

According to an exemplary embodiment of the present invention, an ID of an RFID tag is encrypted using a BE scheme and the encrypted ID is decrypted when a reader identifies the RFID tag. Prior to detailed descriptions, the BE scheme is explained in brief.

In general, the BE allows a transmitter, that is, a broadcast center to transmit information only to intended users among entire users. The BE is required to work effectively in case a collection of users who are to receive the information changes arbitrarily and dynamically. The most essential feature of the BE is the revocation of an unintended device or user, for example, an illegal user or an expired user.

For the revocation, each device is assigned and stores a different key set and a service provider stores key sets of the whole device. After determining a device to revoke, the service provider encrypts a temporary key using other keys excluding the key of the device, encrypts data to transmit using the temporary key, and broadcasts the encrypted temporary key and the encrypted data.

The device selects a key to be used for the decryption from the stored key set by analyzing the received data, decrypts the encrypted temporary key, and then decrypts the encrypted key using the recovered temporary key.

Figure 1:
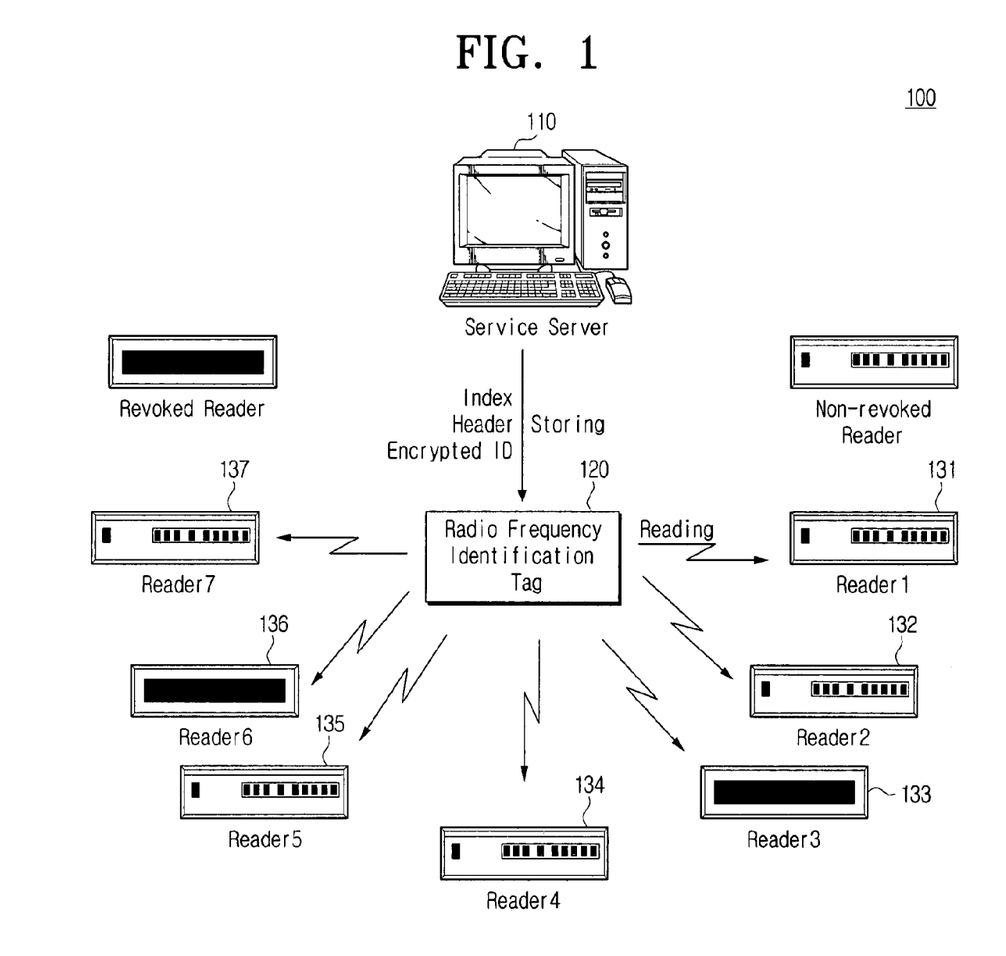
FIG. 1 is a flow diagram illustrating an RFID tag encryption system using a broadcast encryption (BE) scheme according to an exemplary embodiment of the present invention.

FIG. 1 is a flow diagram illustrating an RFID tag encryption system using the BE scheme according to an exemplary embodiment of the present invention.

The RFID tag encryption system 100 includes a service server 110, an RFID tag 120, and a plurality of readers 131 through 137. Although a sole RFID tag 120 is illustrated in FIG. 1, more than one RFID tag may be distributed.

The service server 110 encrypts an ID of the RFID tag 120, generates an index and a header according to information of readers authorized to read the RFID tag 120, and stores the generated index and header therein or in the RFID tag to be distributed. When receiving an encrypted ID from a certain reader, the service server 110 sends an index and a header corresponding to the received encrypted ID to the certain reader.

The RFID tag 120 stores the index and the header which are generated by the service server 110, and the encrypted ID.

Upon reading out the encrypted ID from the RFID tag 120, the plurality of readers 131 through 137 transmits the encrypted ID to the service server 110, receives from the service server 110 and analyzes the index and the header corresponding to the encrypted ID, decrypts the encrypted ID, and thus identifies the RFID tag 120.

In the RFID tag encryption system 100 as constructed above, after the service server 110 distributes the RFID tag 120 storing the index, the header and the encrypted ID, when a certain reader 131 of the plurality of readers 131 through 137 reads out the index, the header and the encrypted ID from the RFID tag 120, the certain reader 131 can identify the RFID tag 120 by decrypting the encrypted ID based on the index and the header. The index, the header and the encrypted ID stored in the RFID tag 120 can be read by privileged readers 131, 132, 134, 135 and 137, and revoked readers 133 and 136.

Figure 2:
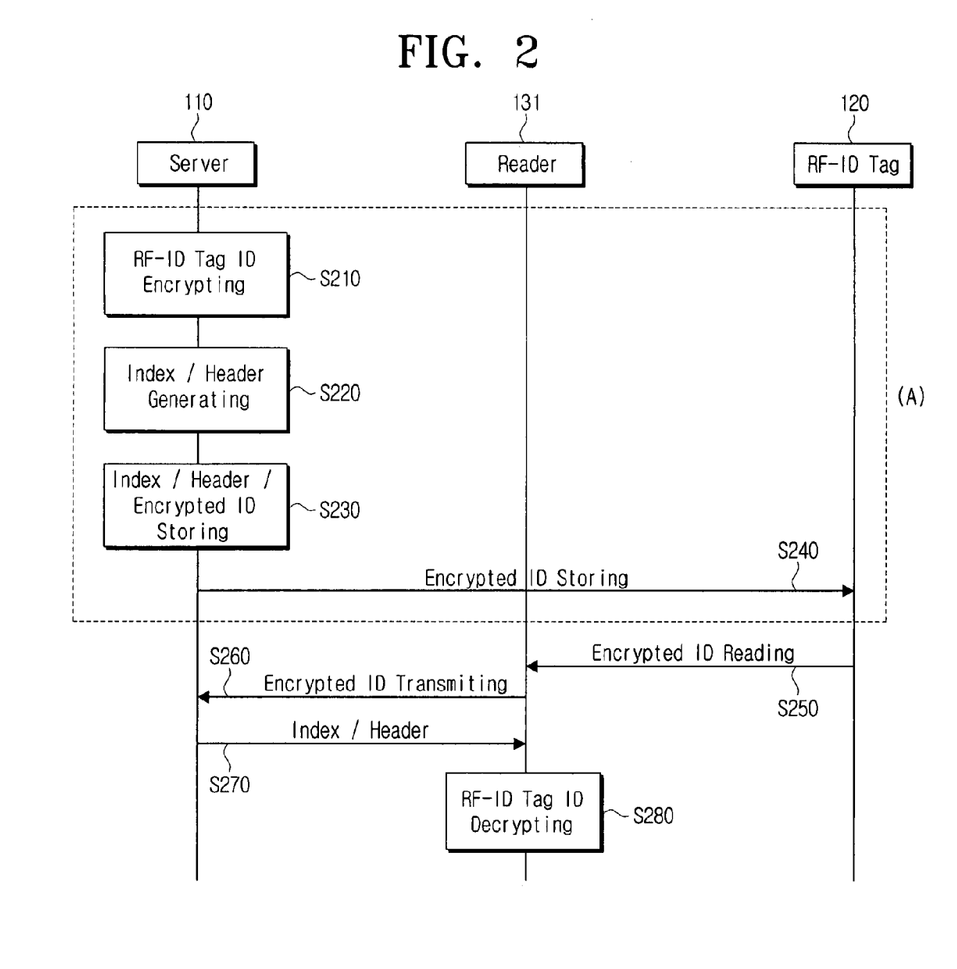
FIG. 2 is a flow diagram illustrating an RFID tag encryption method using a BE scheme according to an exemplary embodiment of the present invention.

FIG. 2 is a flow diagram illustrating an RFID tag encryption method using the BE scheme according to an exemplary embodiment of the present invention.

In an exemplary embodiment of the present invention, the service server 110 encrypts an ID of the RFID tag 120 (S210). Next, the service server 110 generates an index and a header according to information of readers that are authorized to read out the RFID tag 120 (S220). The service server 110 stores the index, the header and the encrypted ID in its internal storing means (S230).

The service server 110 stores the encrypted ID in the RFID tag 120 to be distributed (S240). Next, the service server 110 distributes the RFID tag 120 storing the encrypted ID.

When a certain reader 131 of the plurality of readers 131 through 137 reads the encrypted ID from the RFID tag 120 (S250), the certain reader 131 transmits the read encrypted ID to the service server 110 via a communication means (S260).

In response to this, the service server 110 transmits to the certain reader 131 the index and the header, which are stored therein, corresponding to the received encrypted ID (S270).

The certain reader 131 can identify the RFID tag 120 by analyzing the index and the header received from the service server 110 and decrypting the encrypted ID (S280).

Figure 3:
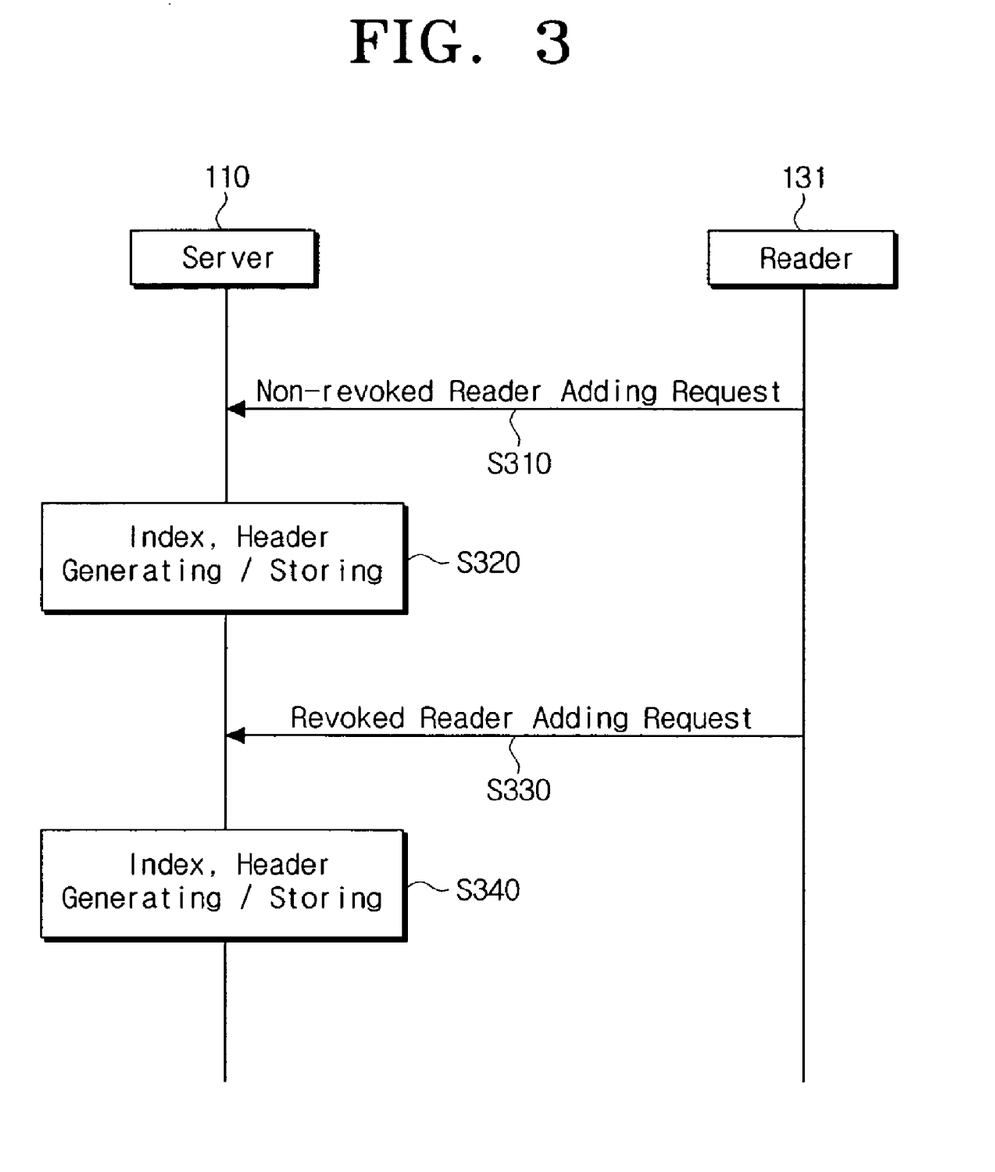
FIG. 3 is a flow diagram illustrating addition of a non-revoked or revoked reader in an RFID tag encryption method using a BE scheme according to an exemplary embodiment of the present invention.

FIG. 3 is a flow diagram illustrating an RFID tag encryption method using the BE scheme according to an exemplary embodiment of the present invention.

In an exemplary embodiment of the present invention, when a non-revoked reader 132 of the plurality of readers 131 through 137 reads out data from the RFID tag 120, a privileged reader 131 requests the service server 110 to add a non-revoked reader 132 capable of reading out the RFID tag so that the service server 110 authorizes the reading of the RFID tag 120 (S310).

Upon receiving the request to add the non-revoked reader 132 capable of reading out the RFID tag, the service server 110 generates and stores an index and a header corresponding to the privileged readers including the non-revoked reader 132 (S320).

When the non-revoked reader 132 reads out the encrypted ID from the RFID tag 120 and transmits the encrypted ID to the service server 110, the service server 110 transmits the corresponding index and header to the non-revoked reader 132. The non-revoked reader 132 can identify the RFID tag 120 by analyzing the corresponding index and header and decrypting the encrypted ID.

The reader 131 requests the service server 110 to add a revoked reader 133 incapable of identifying the RFID tag 120 (S330).

Upon receiving the request to add the revoked reader 133 incapable of identifying the RFID tag 120, the service server 110 generates and stores an index and a header corresponding to revoked readers including the revoked reader 133 (S340).

Hence, even when the revoked reader 133 transmits to the service server 110 the encrypted ID which is read out from the RFID tag 120, the revoked reader 133 cannot identify the RFID tag 120 because the service server 110 sends to the revoked reader 133 the index and the header, which blocks the reader 133 from identifying the RFID reader 120.

Meanwhile, a privileged reader can be designated among the readers accessible to the service server 110 according to a privacy protection policy. The privileged reader may be re-designated as an accessible reader on every distribution path or is kept as it is. For example, when a product distributor receives products from a manufacturer, the manufacturer sets a reader of the product distributor to an accessible reader. Likewise, when a consumer decides to purchase a product, a retailer sets a reader of the consumer to an accessible reader. At this time, the consumer can arbitrarily change the preset accessible reader.

The privileged reader can be designated by selecting a preset privacy protection level. For example, the privacy protection level 1 allows access to the RFID tag only by state organizations such as government and public offices, call for help such as 911, and police station, and medical institutions such as hospital and health center. That is, the RFID tag is accessible only by readers that are set to the privacy protection level 1 or belong to the relevant organizations.

As described above, it is possible to arbitrarily allow readers belonging to an individual or public institution, such as manufacturer, distributor, wholesaler, retailer, consumer, fireman, police officer, hospital and the like, to access the RFID tag.

Figure 4:
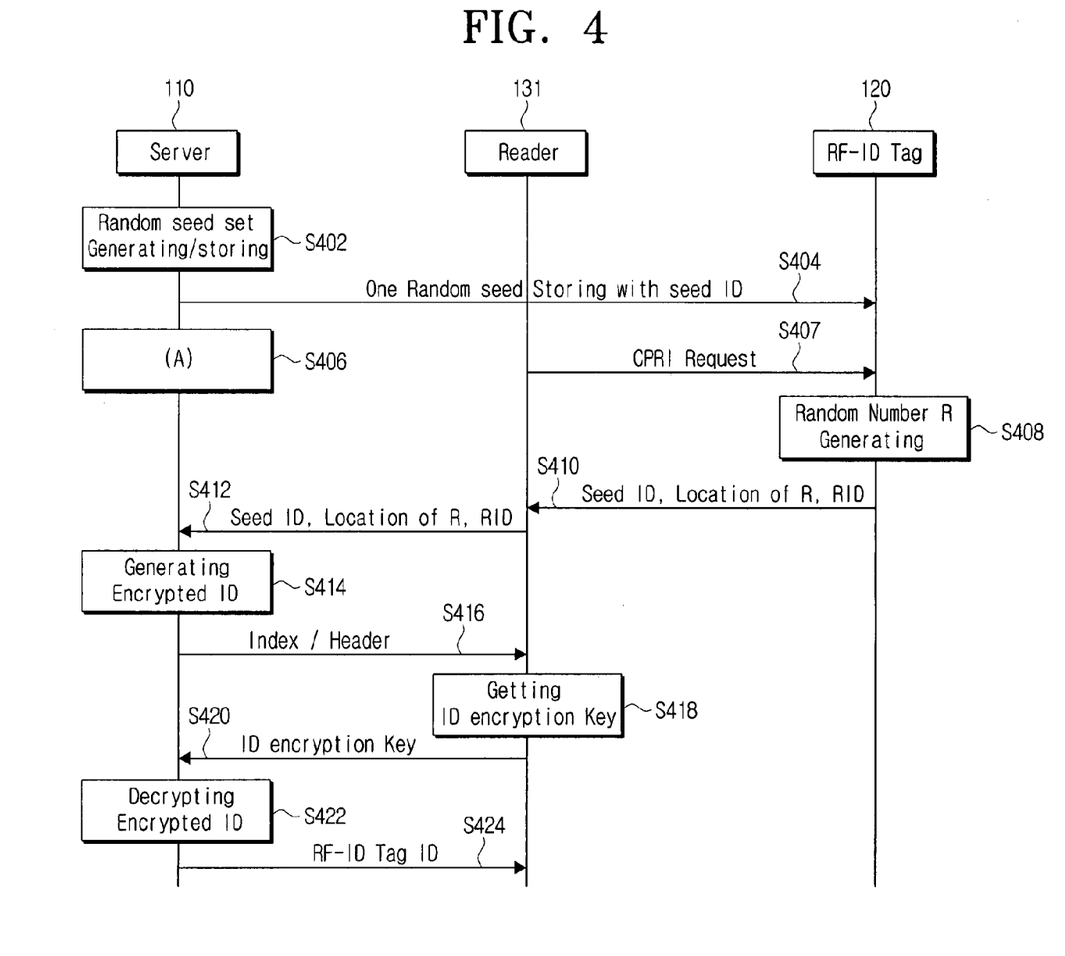
FIG. 4 is a flow diagram illustrating an RFID tag encryption method using a BE scheme according to an exemplary embodiment of the present invention.

FIG. 4 is a flow diagram illustrating an RFID tag encryption method using the BE scheme according to an exemplary embodiment of the present invention.

In an exemplary embodiment of the present invention, the service server 110 generates and stores a random seed set (S402).

The service server 110 stores one element of the random seed set in the RFID tag 120 together with a seed ID (S404).

Next, the service server 110 encrypts the RFID tag 120 storing the one random seed, generates and stores in its internal storing means an index and a header according to the information relating to the non-revoked readers which are authorized to read the RFID tag 120, and stores the encrypted ID in the RFID tag 120 (S406).

When the RFID tag 120 accesses a certain reader 131 by the user, the certain reader 131 requests content, purchase and right information (CPRI) to the RFID tag 120 (S407).

Upon receiving the request for the CPRI from the certain reader 131, the RFID tag 120 generates a random number R (S408).

The RFID tag 120 transmits to the certain reader 131 a location of R which is location information of the random number R based on the seed, the seed ID and the random number ID (RID) which is an encrypted ID exclusive of the random number (S410).

The certain reader 131 forwards to the service server 110 the seed ID, the location of R, and the RID received from the RFID tag 120 (S412).

The service server 110 generates an encrypted ID from the RID received from the certain reader 131 (S414), and transmits the index and the header corresponding to the generated encrypted ID to the certain reader 131 (S416).

The certain reader 131 acquires an ID encryption key by analyzing the index and the header received from the service server 110 (S418).

Next, the certain reader 131 transmits the acquired ID encryption key to the service server 110 (S420). When transmitting the ID encryption key to the service server 110, the certain reader 131 can optionally encrypt the ID encryption key using its secret key.

The service server 110 decrypts the encrypted ID using the received ID encryption key from the certain reader 131 (S422). The service server 110 transmits the decrypted ID of the RFID tag 120 to the certain reader 131 (S424).

Accordingly, the certain reader 131 can identify the RFID tag 120 based on the RFID tag ID received from the service server 110.

Figure 5:
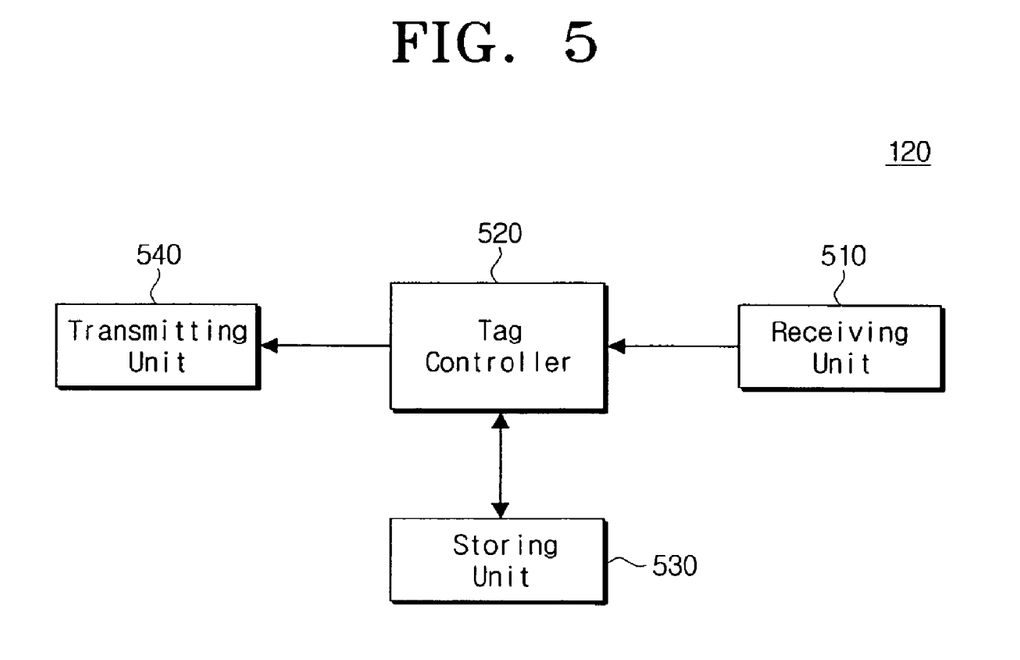
FIG. 5 is a simplified block diagram of the RFID tag.

FIG. 5 is a simplified block diagram of the RFID tag 120.

As shown in FIG. 5, the RFID tag 120 comprises a receiving unit 510, tag controller 520, storing unit 530, and transmitting unit 540.

The receiving unit 510 is responsible for receiving the CPRI request signal from the reader and forwards the CPRI request signal to the tag controller 520. The receiving unit 510 may be implemented using an antenna coil. In an exemplary implementation, upon receiving an electromagnetic wave from the reader, the receiving unit 510 can generate and supply the induced current to the tag controller 520.

The tag controller 520, upon receiving the CPRI request signal from the receiving unit 510, reads out the encrypted ID or the CPRI from the storing unit 530 and provides the encrypted ID or the CPRI to the transmitting unit 540.

The storing unit 530 is responsible for storing the CPRI as well as the encrypted ID, and provides the encrypted ID or the CPRI to the tag controller 520 under the control of the tag controller 520. As details of the CPRI are well known to one skilled in the art, further descriptions are omitted for clarity and conciseness.

The transmitting unit 540 receives the encrypted ID or the CPRI from the tag controller 520 and transmits the encrypted ID or the CPRI toward the reader.

If the RFID tag encryption method using the BE scheme is applied to an automobile, an RFID tag storing a serial number of the automobile key is attached into the automobile. If the key assigned the serial number is lost, the serial number can be read out by accessing the RFID tag using a reader of an owner or a manufacturer of the automobile. According to exemplary embodiments of the present invention, a user is free to designate an additional accessible reader due to changes of the owner such as, for example, used car dealings.

If the RFID tag encryption method using the BE scheme is applied to a missing child prevention, information relating to parents or acquaintance of the child is recorded to the RFID tag and the RFID tag is attached to clothes or shoes of the child since they are less likely to be lost. A reader accessible to the RFID tag is set to a reader belonging to the parents or reliable government offices such as police station or fire station. If the missing child is discovered, the parents or the acquaintance of the missing child can be determined by accessing the RFID tag attached to the clothes or the shoes of the child using the reader of the government office. As such, the missing child prevention system can be implemented. For example, when a child goes to an amusement park, a reader of the office for missing children can be set to the accessible reader according to an exemplary embodiment of the present invention.

As set forth above, when readers read out ID data from the RFID tag, a privileged reader can read the data. Thus, it is possible to block unintended information leakage to the readers.

User usability can be enhanced since an attacker cannot perform access lock on the RFID tag.

Furthermore, even when an attacker continuously sends random information to the reader maliciously, the accessibility to the reader can be reset. As a result, it is possible to prevent the attacker from reading out his/her intended information from the RFID tag and from retrying the tag identification according to the collision avoidance algorithm.

While the present invention has been particularly shown and described with reference to certain exemplary embodiments thereof, it will be understood by those skilled in the art that various changes in form and details may be made therein without departing from the spirit and scope of the invention as defined by the appended claims.

What is claimed is:

1. A radio frequency-identification (RFID) tag usable in an encryption system, the RFID tag, comprising:
   a receiving unit for receiving a request signal from one or more readers;
   a storage unit for storing encrypted ID and an index and a header corresponding to information of readers authorized to read the RFID tag.

2. The RFID tag as claimed in claim 1, wherein the storage unit stores a random seed and a seed ID.

3. The RFID tag as claimed in claim 2, further comprising: a means for generating a random number R.

4. The RFID tag as claimed in claim 3, further comprising:
   a means for transmitting a result of operating the generated random number R and the encrypted ID according to a predetermined logical operation, the seed ID, and location information of the seed ID with respect to the seed to a reader.

5. The RFID tag as claimed in claim 1, further comprising:
   a receiver for receiving a request signal transmitted from a reader; and
   a tag controller for providing the reader with the encrypted ID in response to the request signal.

6. A radio frequency-identification (RFID) tag reader usable in an encryption system, the RFID tag reader comprising:
   a means for reading encrypted ID from an RFID tag; and
   a means for decoding the encrypted ID using an index and a header corresponding to the encrypted ID.

7. The RFID tag reader as claimed in claim 6, further comprising:
a means for transmitting the encrypted ID to a service server,
wherein the index and the header are received from the service server.

8. The RFID tag reader as claimed in claim 6, further comprising:
a means for transmitting an additional request for a non-revoked reader or an additional request for a revoked reader to a service server.

9. A radio frequency-identification (RFID) tag reader usable in an encryption system, the RFID tag reader comprising:
a receiving means for receiving a result of operating a random number R and an encrypted ID according to a predetermined logical operation, a seed ID, and location information of the seed ID with respect to a seed from a RFID tag; and
a transmission means for transmitting the operation result, the seed ID, and the location information to a service server.

10. The RFID tag reader as claimed in claim 9, wherein the receiving means receives an index and a header corresponding to the encrypted ID from the service server.

11. The RFID tag reader as claimed in claim 10, further comprising:
a means for acquiring an encryption key by analyzing the received index and header,
wherein the transmission means transmits the encryption key to the service server.

12. A method for operating a radio frequency identification (RFID) tag in which an encrypted ID, a random seed, and a seed ID are stored, the method comprising:
generating a random number R;
transmitting a result of operating the random number R and the encrypted ID according to a predetermined logical operation, the seed ID, and location information of the seed ID with respect to the seed to a reader.

13. A reading method of a reader for reading a radio frequency identification (RFID) tag, the reading method, comprising:
reading an encrypted ID from the radio frequency identification RFID tag;
decoding the encrypted ID using an index and a header corresponding to the encrypted ID.

14. The reading method as claimed in claim 13, further comprising:
transmitting the encrypted ID to a service server; and
receiving the index and the header corresponding to the encrypted ID from the service server.

15. The reading method as claimed in claim 13, wherein the index and header are stored in the RFID tag.

16. The reading method as claimed in claim 13, further comprising:
transmitting an additional request for a non-revoked reader or an additional request for a revoked reader to a service server.

17. A reading method of a reader for reading a radio frequency identification (RFID) tag, the reading method, comprising:
receiving a result of operating a random number R and an encrypted ID according to a predetermined logical operation, a seed ID, and location information of the seed ID with respect to a seed from the RFID tag;
transmitting the operation result, the seed ID, and the location information to a service server;
receiving an index and a header corresponding to the encrypted ID from the service server;
acquiring an encryption key by analyzing the received index and header;
transmitting the encryption key to the service server; and
receiving an RFID tag ID decoded by the encryption key from the service server.

18. A service method of a service server used for encryption of a radio frequency identification (RFID) tag, the service method comprising:
receiving an encrypted ID of the RFID tag from a reader;
transmitting an index and a header corresponding to the encrypted ID to the reader.

19. The service method as claimed in claim 18, further comprising:
receiving an additional request for a non-revoked reader from the reader;
generating an index and a header for the non-revoked reader and storing the generated index and header; and
if the encrypted ID is received from the non-revoked reader, transmitting an index and a header corresponding to the received ID to the non-revoked reader.

20. The service method as claimed in claim 18, further comprising:
receiving an additional request for a revoked reader from the reader;
generating an index and a header to interrupt the reading of an RFID of the revoked reader and storing the generated index and header; and
if the encrypted ID is received from the revoked reader, transmitting the index and header to interrupt the reading of the RFID to the revoked reader.

21. A service method of a service server used for encryption of a radio frequency identification (RFID) tag, the service method comprising:
receiving a result of operating a random number R generated on the RFID tag and an encrypted ID of the RFID according to a predetermined logical operation, a seed ID, and location information of the seed ID with respect to a seed from a reader;
generating an encrypted ID using the operation result, the seed ID, and the location information, and transmitting the generated encrypted ID to the reader;
receiving an encryption key generated by the encrypted ID from the reader; and
decoding an ID of the RFID tag using the encryption key, and transmitting the decoded ID to the reader.

* * * * *